United States Patent [19]

Viennot

[11] 3,907,955

[45] Sept. 23, 1975

[54] PROCESS FOR MANUFACTURING ELECTRICALLY CONDUCTIVE POLYTETRAFLUOROETHYLENE TUBE

[75] Inventor: Pierre Viennot, Clamart, France

[73] Assignee: Aeroquip A.G., Zug, Switzerland

[22] Filed: July 24, 1973

[21] Appl. No.: 382,172

[30] Foreign Application Priority Data
Aug. 1, 1972  France .............................. 72.27682

[52] U.S. Cl. ................. 264/105; 174/47; 264/127; 264/173; 317/2 J
[51] Int. Cl.² ............ B29D 23/04; F16L 11/12; H05F 3/00
[58] Field of Search .............. 174/47, 68 C, 110 FC; 317/2 R, 2 J; 128/348, 349 R; 138/103, 118, 137; 264/104, 105, 113, 119, 127, 134, 173, 174, 323

[56] References Cited
UNITED STATES PATENTS

| | | | |
|---|---|---|---|
| 2,857,915 | 10/1958 | Sheridan | 128/349 R |
| 2,945,265 | 7/1960 | Sell, Jr. et al. | 264/127 UX |
| 3,070,132 | 12/1962 | Sheridan | 317/2 J X |
| 3,166,688 | 1/1965 | Rowand et al. | 317/2 J |
| 3,303,252 | 2/1967 | Rogers | 264/174 |
| 3,473,087 | 10/1969 | Slade | 317/2 J |
| 3,845,186 | 10/1974 | Shaw | 174/47 X |

FOREIGN PATENTS OR APPLICATIONS

| | | | |
|---|---|---|---|
| 45-32633 | 10/1970 | Japan | 264/127 |

*Primary Examiner*—Laramie E. Askin
*Attorney, Agent, or Firm*—Baldwin, Wight & Brown

[57] ABSTRACT

An electrically-conducting polytetrafluoroethylene tube having on the inner surface thereof, or in its mass, conductive strips parallel to the axis of the tube is described. It is obtained by the extrusion of a pure Ptfe preform having channels or grooves wherein, at the moment of extrusion, there is flowed an aqueous dispersion of Ptfe containing from 1 to 50 percent by weight of graphite and/or carbon black. This tube is suited to all applications where static electricity has to be dissipated, notably for the high speed transport of fluids in the aeronautic industry.

5 Claims, 6 Drawing Figures

US Patent  Sept. 23,1975  Sheet 1 of 2  3,907,955

PROCESS FOR MANUFACTURING ELECTRICALLY CONDUCTIVE POLYTETRAFLUOROETHYLENE TUBE

This invention relates to a tubular polytetrafluoroethylene article rendered electrically conductive and to the process for obtaining same.

The production of flexible polytetrafluoroethylene (abbreviated Ptfe hereinafter) tubings adapted more especially for the transport of pressure fluids in the aeronautic industry, should comply with the severe requirements with respect to the characteristics of the materials offered to users thereof.

Notably, and independently of the necessary mechanical standards with respect to the conditions of service, said products are required to possess an inner electrical conductivity promoting the evacuation of static charges generated by the rapid passage of the fluids transported. The serious drawbacks caused by said charges are known, notably:

a. risk of inflammation in the case of the transport of a combustible fluid.

b. the risk of leakage through the wall of the tube liable to perforate the tube wall.

Various solutions have been proposed to remedy these drawbacks, for example, in U.S. Pat. Nos. 2,108,759; 3,070,132, and 2,752,637. In its most conventional form the solution provided consists in rendering said tube relatively conductive throughout its total volume by the incorporation of an electrically conductive component in the mass of the Ptfe tube. However, although such solution appears to be intellectually satisfactory, it results in the creation of a material which is heterogenous throughout its mass. The resulting consequences are partial deterioration of physical, and consequently mechanical, characteristics of the final product. In particular, its porosity which should so far as possible approach perfection owing to the performance requirements is not realized.

Another known solution consists in forming a composite tube consisting of two intimately bonded concentric sheaths one of which, the inner one, is rendered electrically conductive by incorporation into the mass thereof of variable proportions of an electrically conductive pulverulent material. It is also known that the elaboration of such a complex is usually effected by the formation of two concentric preforms, for subsequent extrusion, an inner one rendered conductive as previously indicated, the other outer one consisting of the pure material required by the use to which it is to be put. Certain drawbacks are clearly apparent in this known conception. In order to obtain good "bonding" of the inner sheath, the composite material of the inner preform, formed by the mixture of pulverulent products, involves the use of a very low percentage of conductive material (owing to the mixture being defective) with the inevitable repercussions on the conductivity of the product.

For this reason — low conductivity — and also for manufacturing reasons, it is necessary for the continuous inner conductive sheath to be provided with considerable dimensions. For the manufacture of the inner preform constituted, as stated above, of a mixture of pulverulent products it is necessary to provide a substantial gap between the mandrel and the die used to produce it, with the repercussions this fact has on the thickness of the conductive sheath of the final product, a thickness generally multiple of one-tenth of a millimeter developed with a highly porous product.

The known tubes so realized are suited to dissipate electrostatic charges without danger of breaking or cracking the tube, owing to the formation of uninterrupted electrical conductive pathways lengthwise of the tube. They are characterized by a very low conductivity of about 3 microamperes at 1 Volt per cm.

Now, it has been discovered, according to the present invention, that excellent results are obtained by using tubes comprising for the major part pure polymer and continuous strips formed from an aqueous polymer dispersion containing at least one electrically conductive pulverulent material in an amount of up to 50 percent by weight of the polymer with which it is mixed.

According to one of its first aspects, the invention therefore relates to a tetrafluoroethylene polymer tube having an electrically conductive zone and characterized in that the said zone is in the form of continuous strips, parallel to the axis of the tube, and of small cross-section with respect to the cross-section of the tube, the said strips being constituted of a mixture of polytetrafluoroethylene and at least one pulverulent electrically conductive material, this being present in said mixture in an amount of up to 50 percent by weight based on the mixture.

Graphite, carbon black or mixtures thereof are advantageously used as a conductive pulverulent material. However, the invention also applies to pulverulent materials of the type of metal powders, such as copper and copper alloys, aluminum, gold, silver and ferrite powders, and other electrically conductive powders.

Graphite or a mixture of graphite and carbon black is preferably used. The best results were obtained with mixtures containing, by weight, 20 percent graphite and 10 percent carbon black, as well as with mixtures comprising about 35 percent by weight pure graphite.

The percentage of conductive pulverulent material incorporated can vary from very low values up to 50 percent by weight. The lower limit is only conditioned by the conductivity to be obtained; the upper limit is conditioned by the necessity of obtaining a mixture having a viscosity sufficiently low to permit it to flow without pressure, in a high porosity product and in a small interstitial space.

With respect to the aforesaid it should be noted that one of the advantages of the invention lies in the fact that, given the importance of the percentage of pulverulent material incorporated in the conductive mixture, and contrary to previous realizations, the mesh size is not a critical feature. By way of example, the pulverulent material presents a mesh size in the range of 4 to 50 microns. The conductive strips obtained by the process according to the invention are characterized by high conductivity, in the range of 500 microamperes at 1 Volt per cm.

The conductive strips can be provided on the inner surface of the tube, on its outer surface, or in the mass thereof. In the last case it is therefore a question of tubular channels parallel to the axis of the tube.

From another point of view, the present invention concerns a process for the manufacture of tetrafluoroethylene polymer tubes having a conductive zone, by making use of a cylindrical preform in an extrusion press and a mixture containing an electrically conductive pulverulent material, the said process being characterized in using a single preform of pure polytetrafluooroethylene, the said preform having continuous channels parallel to its axis and of small cross-section, at the moment of extrusion an aqueous dispersion of tetrafluoroethylene polymer containing up to 50 percent by weight of said conductive pulverulent material being flowed without pressure into the said channels, and the preform is extruded in a known manner.

The tubes according to the invention are obtained on usual extrusion presses starting with a single polymer preform wherein there are provided continuous longitudinal grooves or channels in which the conductive mixture is flowed without pressure at the time when the preform is extruded.

Said preform is, for example, a cylindrical sleeve of pure Ptfe the thickness of which corresponds to the size of the annular space between the die and the extrusion mandrel and having on the inner cylindrical surface thereof one or more continuous channels extending linearly longitudinally of the tube; said channels, of variable number and arrangements, are of small size with respect to the transversal dimensions of the tube, in the order of a few millimeters for example.

It should be noted that said channels can be provided annularly in the mass of the preform or on the outer surface thereof.

Said preform is prepared on a conventional press, the pressure applied should be just sufficient to agglomerate the Ptfe powder. A high level of porosity is thus obtained permitting subsequent impregnation by the conductive mixture.

The preform thus fashioned is introduced between the die and the extrusion mandrel, a mixture composed of Ptfe and the conductive pulverulent material then being flowed into said channels.

As a precursor of the mixture there are used aqueous disperions of tetrafluoroethylene polymer such as are available on the market.

A convenient method for realizing the mixture consists in introducing into a flexible flask a magnet, the rotation of which, by means of a conventional magnetic stirrer, ensures homogenization of the mixture. The mixture can be maintained in constant agitation without any drawbacks during the entire duration of an extrusion run and therefore is constantly available in a perfectly homogenous form.

The mixture is, for example, obtained by the incorporation of about 200g of graphite in an aqueous dispersion containing 500g of polymer, the dispersion being sold by the manufacturers of Ptfe (about 60 percent dry extract).

One example of embodiment of the invention will be described in detail hereinafter, with reference to the appended drawings wherein.

Figure 1:
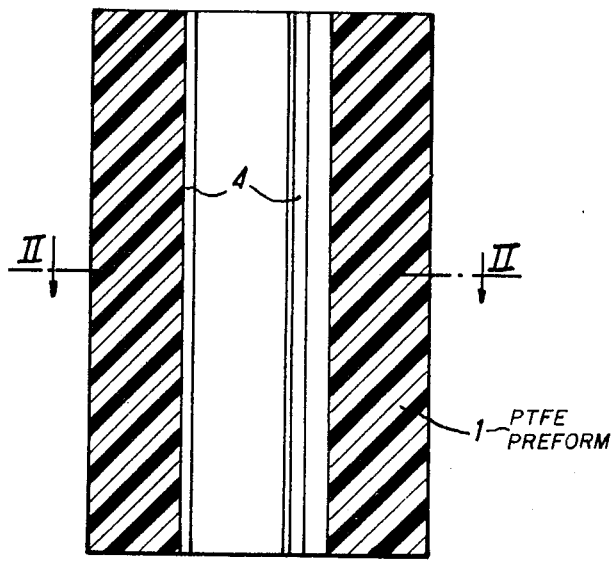
FIG. 1 is a vertical cross-sectional view of a preform according to the invention.
Figure 2:
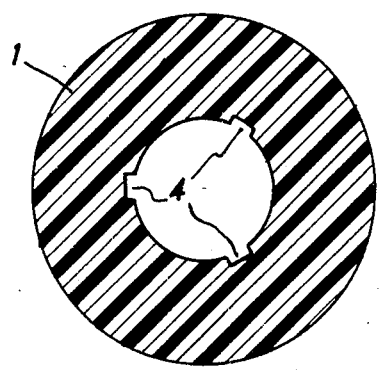
FIG. 2 is a horizontal cross-sectional view along II — II of FIG. 1.

Referring to FIGS. 1 and 2, preform 1 to be used is, in a conventional manner, a cylindrical pure Ptfe sleeve the inner and outer diameters of which correspond to those of the piston 2 and die 3 of the extrusion press in which it is to be introduced. According to the invention, said preform has the pecularity of having on the inner surface thereof several, in this case three, open, continuous channels 4, positioned at 120° in this example. Said channels have a cross-section of a few millimeters.

It could have a different number of such channels.

Figure 3:
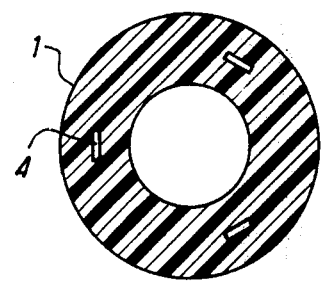
FIG. 3 is a similar cross-section to that of FIG. 2 on a smaller scale for a variant of embodiment of the preform.
Figure 5:
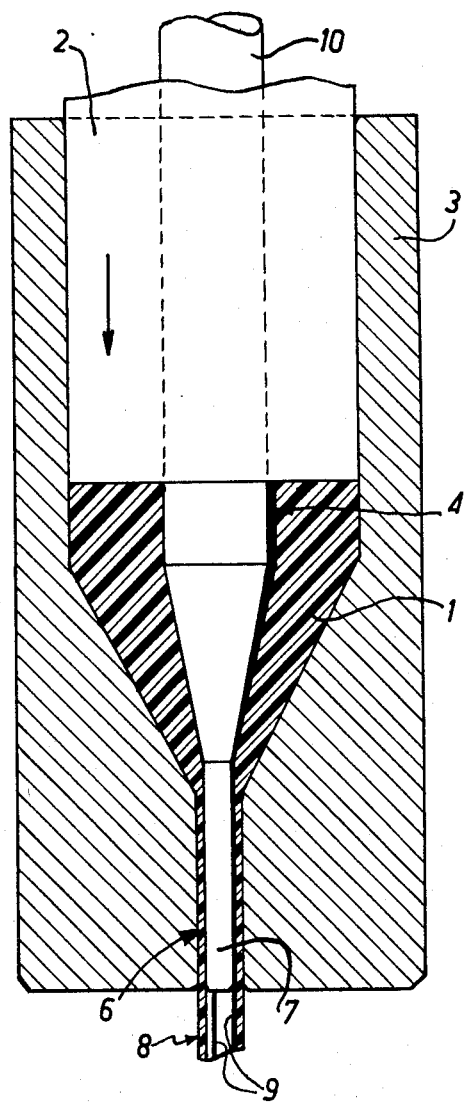
FIG. 5 is a similar view to the preceding one with the piston during extrusion.
Figure 4:
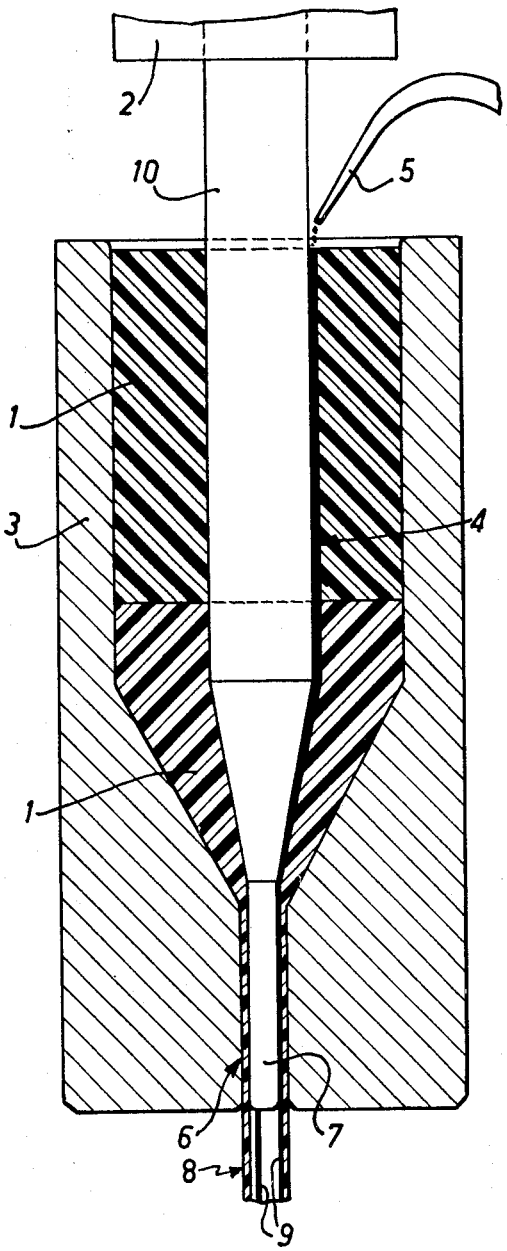
FIG. 4 is a cross-sectional view of an extrusion die using a preform according to the invention.

Channels 4 could also be formed either in the thickness of the preform (FIG. 3) or on the outer surface thereof. As is seen in FIGS. 4 and 5, the preform is introduced in a known manner between the die 3 and mandrel 10 of the press.

The manufacture of the preform is assumed in this case to have been realized outside the extrusion assembly; however, by the positioning of a suitable device, it is possible to realize said preform and to pour the conductive mixture in the extrusion pot. At the same time the centering of the final tube is substantially improved, with the ensuing mechanical advantages.

An aqueous dispersion of Ptfe containing a high proportion of graphite, or graphite-carbon black mixture is flowed into channels 4.

Said pouring can be effected directly through nozzle 5 of the flask in which the strongly conductive mixture has been realized, or by another means.

It is clear that piston 2 of the extrusion press pushes towards end 6 of the die about mandrel 7, the Ptfe mass constituting the body 8 of the tube along which form three strips 9 of the conductive mixture flowed without pressure into spaces 4.

Figure 6:
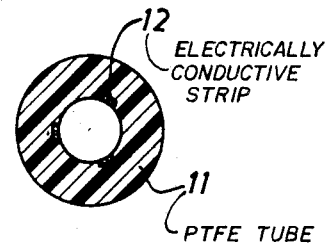
FIG. 6 is a cross-sectional view of a tube according to the invention.

As soon as the channels are filled, extrusion pressure is applied immediately to the whole, this finishing the impregnation previously effected and inducing superficial integration of the mixture and preform. FIG. 6 shows the tube obtained. It consists of a polytetrafluoroethylene tube 11 comprising three conductive strips 12 on the inner surface thereof. The cross-sections of strips 12 are only a few one one-hundredths of a mm.

As the proportion of graphite and/or carbon/black in the Ptfe dispersion can vary within very broad proportions, a tube having good dielectric qualities, good resistance to cracking, low porosity and excellent qualities of dispersion of electrostatic charges is obtained at will.

The fact of using a liquid as dispersion agent of a pulverulent product enables a better distribution of the conductive charge to be obtained, and consequently increases the percentage of same in notable proportions, resulting in improving the resulting conductivity.

The technique of impregnating a porus preform with a liquid permits extremely thin (a few hundredths of a mm) conductive channels to be formed, but which are nevertheless sufficient to ensure the necessary conductivity without lowering the physical and mechanical qualities of the composite product obtained.

The fact of incorporating in a Ptfe tube a component such as the conductive mixture, which is always heterogenous and therefore porous even in the most favorable case, is prejudicial to the economy of an assembly the first characteristic of which, owing to its use in high pressure fluid circuits, should be a maximum resistance to seeping. In the tube according to the invention, as the volume of the conductive channels is reduced to a necessary and sufficient minimum, the reduction of the heterogenous, and therefore mechanically parasitic component, maintains practically the whole thickness of pure Ptfe having the best mechanical characteristics sought.

The fact of being able to evacuate static electricity preferably by strips and not by a continuous sheath permits the interior of the Ptfe tube to be checked visually and detect the appearance of splits or structural defects due to bad production or mishaps in manufacture.

The tubes according to the invention can be used in all cases where static electricity has to be evacuated and notably:

transport of pressure fluids (to avoid disruptive discharges through the wall), transport of combustible fluids (to avoid inflammation)

Their application is particularly advantageous in the aerospace industry.

I claim:

1. In a process for the manufacture of polytetrafluoroethylene tubes having a conductive zone by placing in an extrusion press a cylindrical preform and a mixture containing an electrically conductive pulverulent material the improvement of using a single preform of pure polytetrafluoroethylene, said preform having continuous channels parallel to the axis thereof and of small cross-section, and at the moment of extrusion flowing without pressure into the said channels an aqueous dispersion of tetrafluoroethylene polymer containing up to 50 percent by weight of said pulverulent conductive material and extruding the preform.

2. The process of claim 1, including using as the preform a preform having on the inner cylindrical surface thereof several continuous open grooves extending parallel to the axis.

3. The process of claim 1, including using as the preform a preform having in its mass several continuous channels extending parallel to the axis.

4. The process of claim 1, wherein the step of flowing comprises flowing an aqueous dispersion containing from 1 to 50 percent by weight of conductive pulverulent material.

5. The process of claim 1, wherein the step of flowing comprises flowing an aqueous dispersion containing a conductive pulverulent material selected from the group consisting of graphite, carbon black and mixtures thereof.

* * * * *